(12) United States Patent
Salani et al.

(10) Patent No.: US 6,174,017 B1
(45) Date of Patent: Jan. 16, 2001

(54) DUMPING AND ARTICULATING SEAT

(75) Inventors: Joseph L. Salani, Oxford; Louis A. Rhodes, Farmington Hills, both of MI (US)

(73) Assignee: DaimlerChrysler Corporation, Auburn Hills, MI (US)

(*) Notice: Under 35 U.S.C. 154(b), the term of this patent shall be extended for 0 days.

(21) Appl. No.: 09/433,678

(22) Filed: Nov. 4, 1999

(51) Int. Cl.$^7$ ........................................................ B60N 2/02
(52) U.S. Cl. ........................... 296/65.03; 296/65.09; 296/65.05; 297/340; 297/331
(58) Field of Search ........................ 296/65.09, 65.05; 297/340, 344.1, 331, 325, 326

(56) References Cited

U.S. PATENT DOCUMENTS

| | | |
|---|---|---|
| 324,232 | 8/1885 | Clarkson . |
| 3,727,976 * | 4/1973 | Lystad ................... 297/340 |
| 4,227,736 | 10/1980 | Lebault et al. . |
| 4,368,916 | 1/1983 | Blasin . |
| 4,475,769 | 10/1984 | Crawford et al. . |
| 4,484,776 | 11/1984 | Gokimoto et al. . |
| 4,512,609 * | 4/1985 | Parsson ................... 297/331 |
| 4,627,656 | 12/1986 | Gokimoto et al. . |
| 4,636,003 * | 1/1987 | Siebler ................... 297/340 |
| 4,695,094 * | 9/1987 | Siebler ................... 297/331 |
| 4,699,418 | 10/1987 | Plavetich . |
| 4,767,157 * | 8/1988 | Kazaoka et al. ................ 297/340 |
| 4,869,541 | 9/1989 | Wainwright . |
| 5,044,683 | 9/1991 | Parsson . |
| 5,195,795 | 3/1993 | Cannera et al. . |
| 5,383,699 | 1/1995 | Woziekonski et al. . |
| 5,570,931 * | 11/1996 | Kargilis et al. ................ 297/344.1 |
| 5,593,208 * | 1/1997 | Mitschelen et al. .............. 296/65.09 |
| 5,626,391 * | 5/1997 | Miller et al. .................. 297/331 |
| 5,857,746 | 1/1999 | Barrere et al. . |
| 5,904,404 | 5/1999 | McCulloch et al. . |
| 5,918,939 | 7/1999 | Magadanz . |
| 5,979,985 * | 11/1999 | Bauer et al. ................. 297/340 |
| 6,010,190 * | 1/2000 | Downey ..................... 297/340 |

* cited by examiner

*Primary Examiner*—Joseph D. Pape
*Assistant Examiner*—Kiran Patel
(74) *Attorney, Agent, or Firm*—Roland A. Fuller, III

(57) ABSTRACT

A vehicle seat that articulates and dumps is provided. The vehicle seat includes an articulation link connected to a bottom frame and a seat frame. The seat frame is also connected to a seatback frame. The seatback frame is connected to a bottom frame. The articulation link allows the seat frame to rotate down to the bottom frame while the seatback frame articulates forward and downwardly toward the seat frame. The vehicle seat can be dumped forwardly and upwardly around a dumping pivot. A dumping mechanism releases the bottom frame from the vehicle deck so that the bottom frame can rotate forwardly and upwardly. The bottom frame rotates about the dumping pivot which is attached to a dumping frame. The dumping frame is shaped so that it provides clearance for the headrest and the seat cushion end of the seat frame when the vehicle is substantially dumped in a vertical position relative to a vehicle floor pan.

16 Claims, 4 Drawing Sheets

DUMPING AND ARTICULATING SEAT

BACKGROUND OF THE INVENTION

1. Field of the Invention

The present invention relates generally to an apparatus in a vehicle seat for articulating and dumping. More particularly, the present invention is directed to a linkage mechanism that allows articulation and dumping of a vehicle seat.

2. Description of the Related Art

Many vehicles, particularly minivans and sport utility vehicles, have seats which articulate so that the seatback frame rotates forwardly and downwardly toward the seat frame and vehicle floor. Articulation allows the vehicle seats to collapse down to the vehicle deck by the seatback frame rotating forwardly down to the seat frame. This articulation provides an increase in the interior space of a vehicle. For example, articulating downward the back seats in a minivan so that all of the back seats collapse, expands the cargo interior space of the minivan so that large objects can be placed inside of the vehicle. Another movement of vehicle seats is dumping. A vehicle seat dumps by rotating forwardly and upwardly relative to the vehicle deck. Dumping allows an increase in the space in front of seats located behind a dumped seat. Dumping of the vehicle seat also increases the cargo floor area within the vehicle. A forward dumped vehicle seat allows greater access space to rear seating located behind the dumped vehicle seat.

Other vehicle seats are designed to either articulate or dump. Traditional articulating vehicle seats, however, articulate the seatback frame to a position where the seatback does not completely collapse to a substantially horizontal position, or a position parallel to the vehicle deck. Consequently, the seatback is angled slightly upward because the seatback rests against the seat bottom. The angled seatback frame prevents a subsequent complete dumping of the vehicle seat to a substantially vertical position because the angled seatback prevents a full rotation of the seat to the vertical position. Additionally, these articulating seats do not have a dumping feature. In view of the disadvantages associated with currently available vehicle seats, it is desirable to provide a vehicle seat having a linkage mechanism which allows the seatback to articulate into a substantially horizontal position, and allows the vehicle seat to be dumped into a substantially vertical position.

SUMMARY OF THE INVENTION

In accordance with the teachings of the present invention, a vehicle seat that dumps and articulates is disclosed. The vehicle seat includes a bottom frame and a seatback frame that is pivotally supported on the bottom frame. The seatback frame is pivotally connected to a seat frame. Therefore, the seatback frame can rotate downward toward the seat frame. An articulating link is connected between a lower pivot formed on the bottom frame and an upper pivot formed on the seat frame. The articulation link permits the seatback frame to fold down so that the seatback frame is parallel to a vehicle deck. A dumping frame has a dumping pivot that supports the bottom frame. The dumping pivot allows the bottom frame to rotate about the dumping frame. The dumping of the entire vehicle seat results in the vehicle seat being oriented in a vertical upright position.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
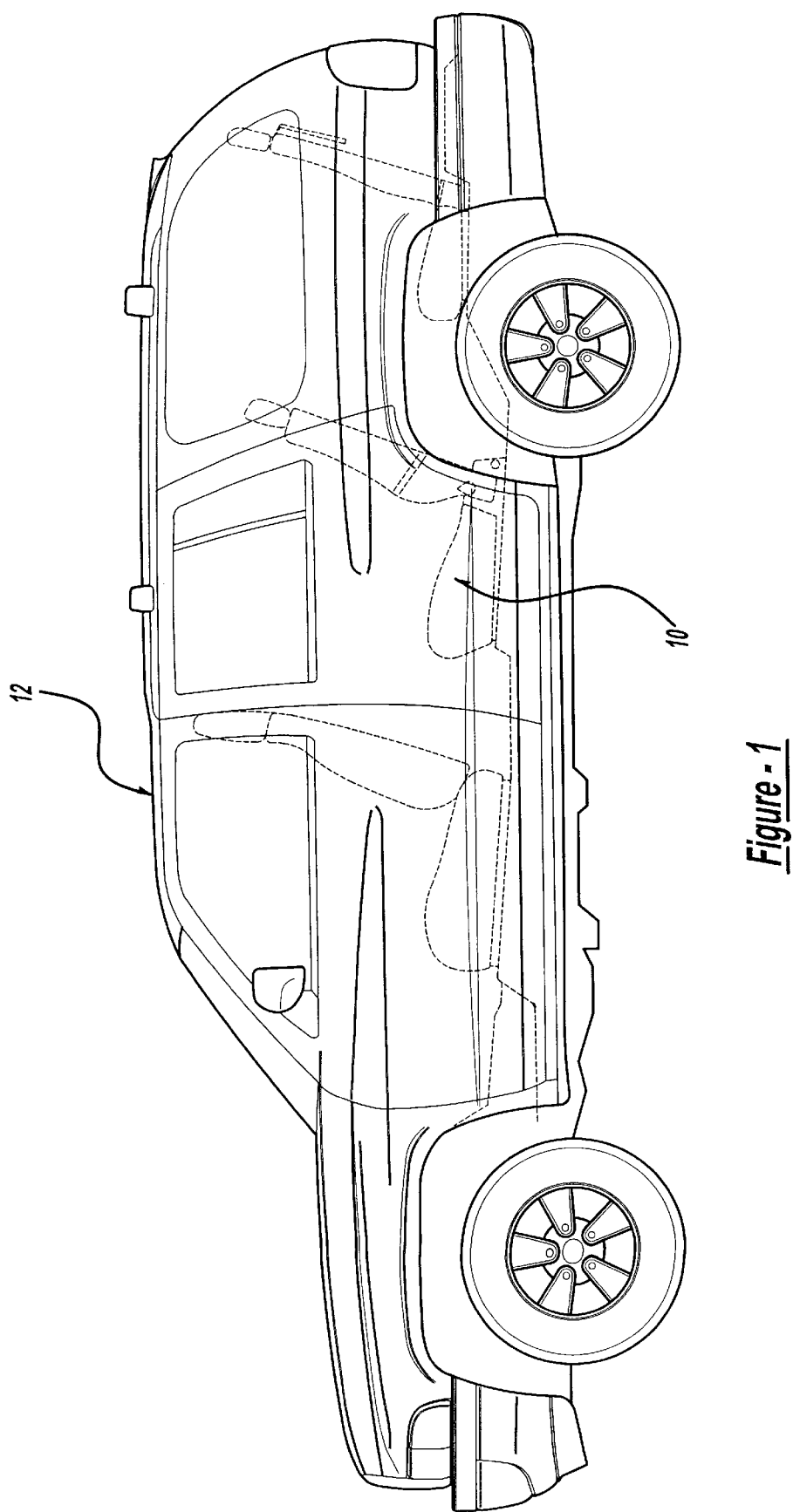
FIG. 1 is a side elevational view of an exemplary vehicle which can accommodate the vehicle seat of the present invention.
Figure 2:
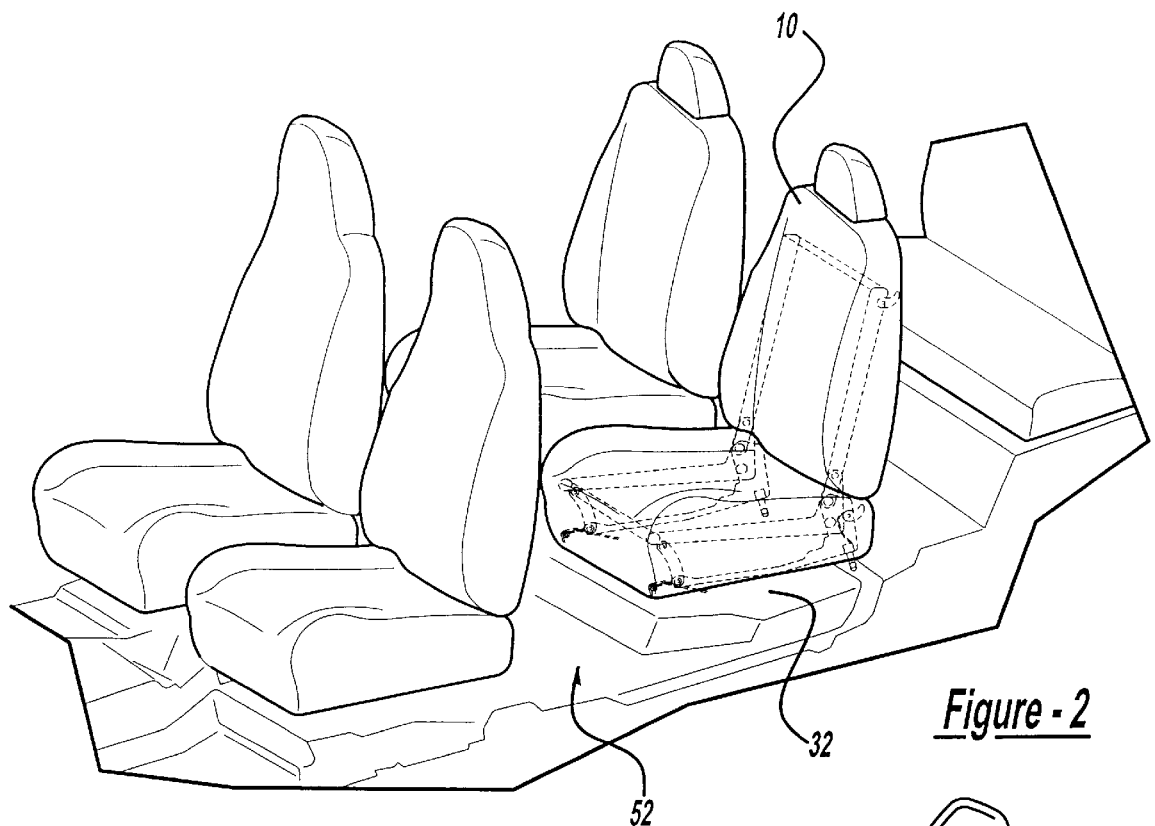
FIG. 2 is a perspective view of a vehicle seat in accordance with a preferred embodiment of the present invention.

Referring to FIG. 1, the vehicle seat 10 is installed in an exemplary vehicle 12 as the middle set of seats in accordance with a preferred embodiment of the present invention. FIG. 2 shows a perspective view of the vehicle seat 10 and its associated mechanism in an upright position. While only one side of the linkage mechanism of vehicle seat 10 will be described in detail, one skilled in the art will appreciate that the left and right linkage assemblies shown in FIG. 2 are substantially similar.

Figure 3:
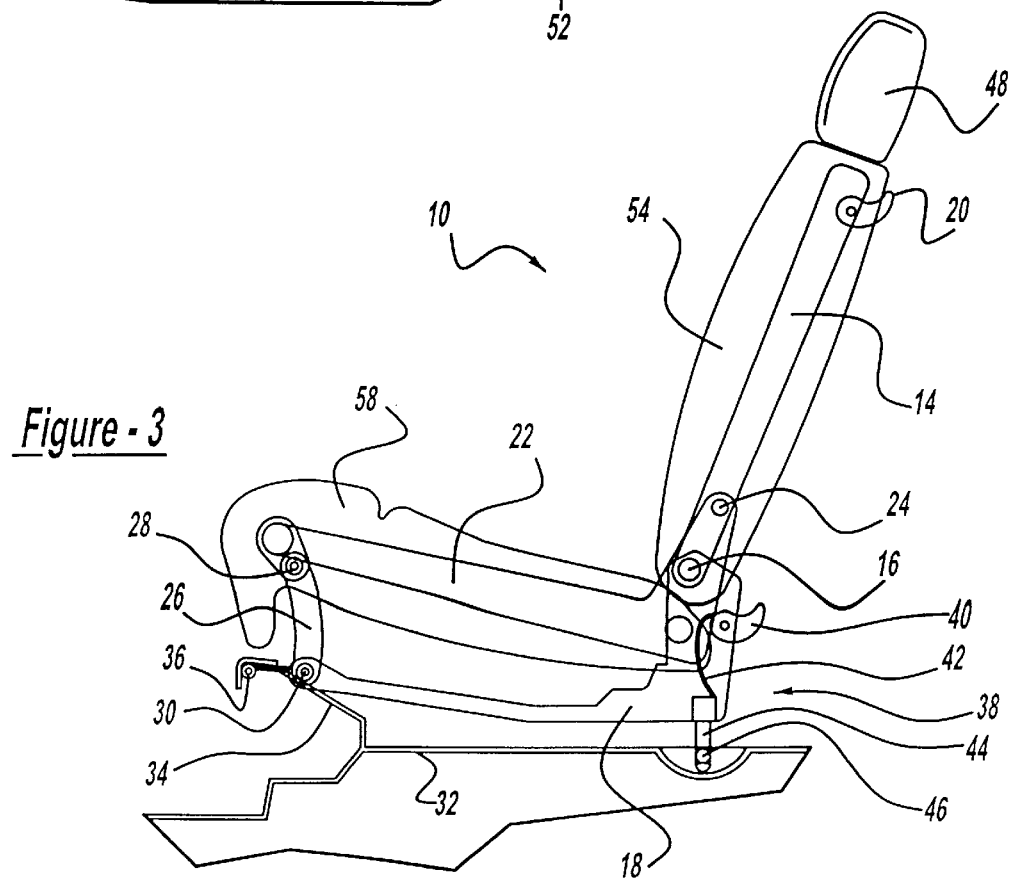
FIG. 3 is a side elevational view of the vehicle seat of FIG. 1 in an upright position.

FIG. 3 shows vehicle seat 10 in an upright position. FIG. 3 best shows the components for articulating the vehicle seat 10. More specifically, a seatback frame 14 is pivotally connected by an articulation pivot 16 to a bottom frame 18. The articulation pivot 16 allows the seatback frame 14 to articulate forwardly and downwardly relative to the fixed bottom frame 18. In the preferred embodiment, an articulation release handle 20 releases the seatback frame 14 for pivotal movement about the articulation pivot 16.

Figure 4:
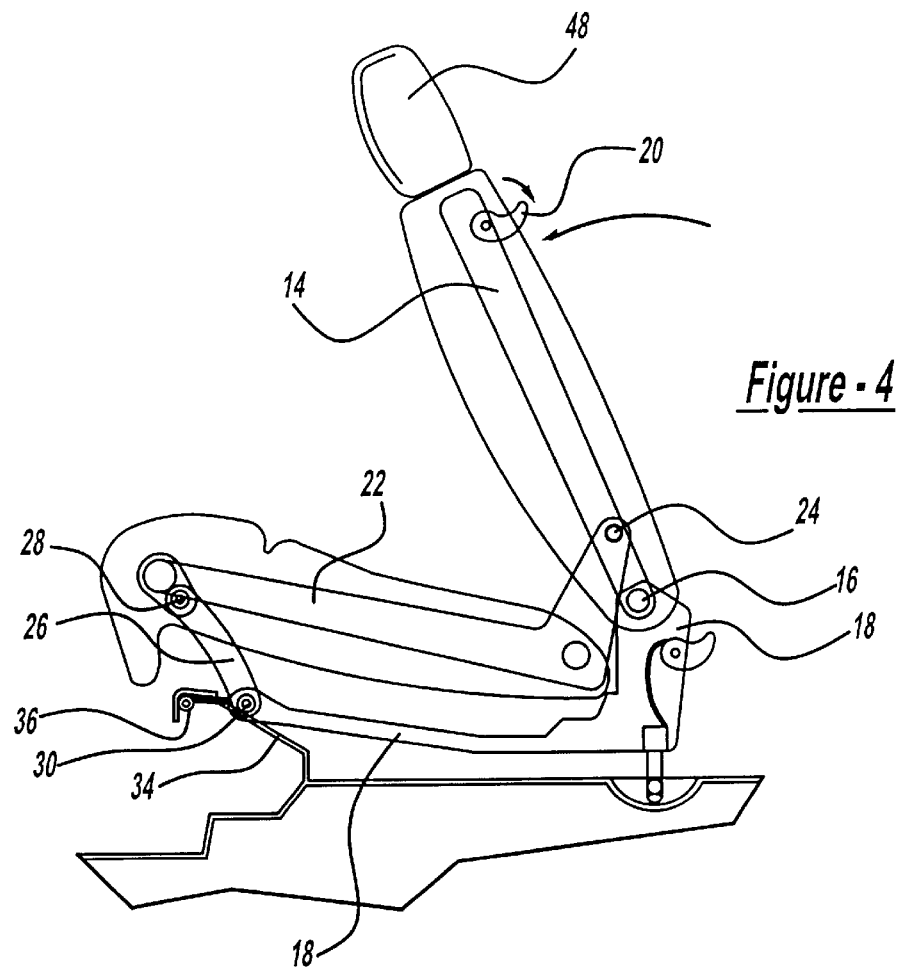
FIG. 4 is a side elevational view showing the vehicle seat in a partially articulated position.
Figure 5:
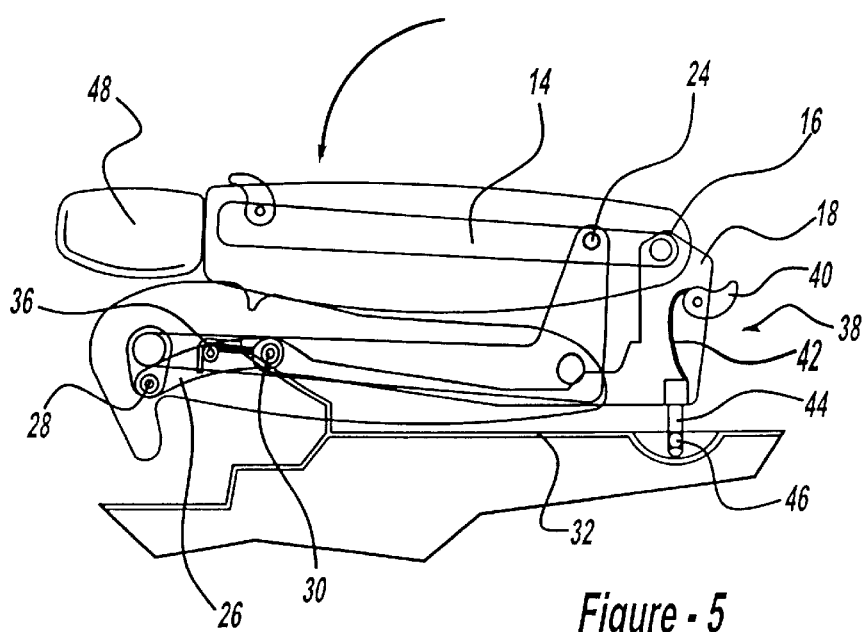
FIG. 5 is a side elevational view showing the vehicle seat of FIG. 1 in a fully articulated position.

A seat frame 22 is connected to the seatback frame 14 by a seatback pivot 24. As shown in FIGS. 4 and 5, the seatback pivot 24 travels in an arcuate path about the fixed articulation pivot 16. The seat frame 22 is also connected to the bottom frame 18 by an articulation link 26. The articulation link 26 is coupled to the seat frame 22 by an upper pivot 28. The articulation link 26 is also connected to the bottom frame 18 by a lower pivot 30. As will be appreciated from the following description, the seat frame 22 hangs from the seatback frame 14 at seatback pivot 24. Thus, the seat frame 22 is not directly connected to the rear portion of the bottom frame 18. The seatback pivot 24 cooperates with the rotation of the articulation link 26 so as to permit the seat frame 22 to rotate forwardly and downwardly relative to the bottom frame 18, thereby permitting the seatback frame 14 to articulate into a substantially parallel position (FIG. 5) with respect to the vehicle deck 32. As can be appreciated, the seatback frame 14, the articulation link 26 and seat frame 22 and the bottom frame 18 form a four-bar linkage mechanism. The vehicle seat 10 preferably has a cushioned exterior. More specifically, a seatback cushion 54 covers the seatback frame 14 and a seat cushion 58 covers the seat frame 22.

FIG. 4 shows the seatback frame 14 in a partially articulated position. FIG. 4 also shows that the seatback pivot 24 rotates forwardly about the articulation pivot 16 and forces the seat frame 22 forwardly and downwardly into the position of FIG. 5. FIG. 5 shows the seatback frame 14 in its fully articulated and substantially horizontal position. FIGS. 4 and 5 also show the motion of the articulation link 26 as it rotates into a fully articulated position. This feature also allows seatback frame 14 to be oriented parallel to the vehicle deck 32. Accordingly, the seatback frame 14 can be oriented parallel to the vehicle deck 32 because the seat frame 22 moves from an inclined position (FIG. 3) to a relatively parallel position (FIG. 5). The orientation of the seatback frame 14 and bottom frame 18 result in a low profile and compact vehicle seat when fully articulated, which allows for greater cargo space within the vehicle 12.

Figure 6:
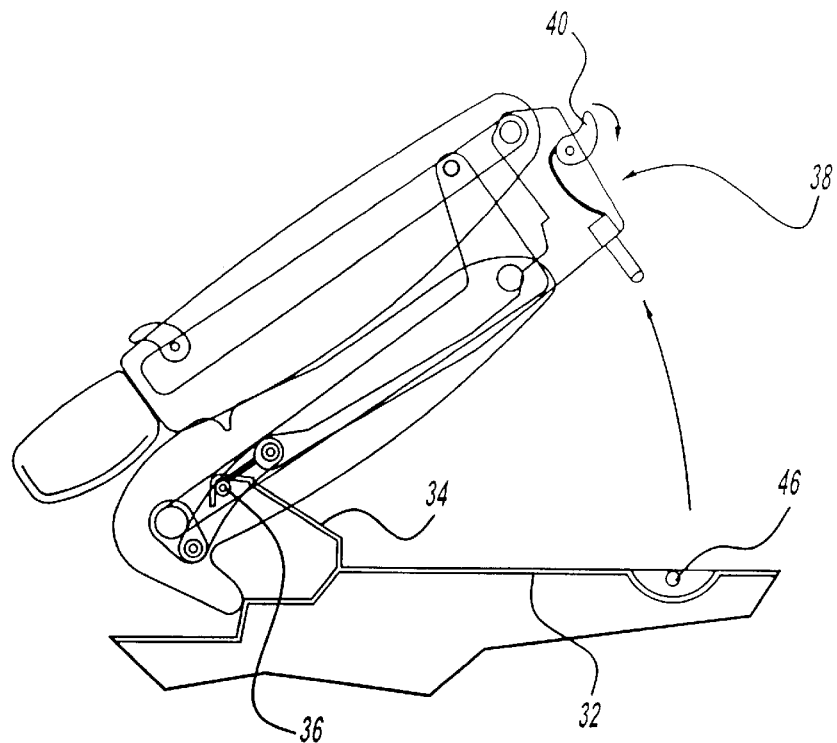
FIG. 6 is a side elevational view showing the vehicle seat of FIG. 1 in a partially dumped position.

With reference to FIGS. 5 and 6, a front portion of the bottom frame 18 is connected to a dumping frame 34 via a dumping pivot 36. A rear portion of the bottom frame 18 is secured to the vehicle deck 32 by a dumping mechanism 38. The dumping mechanism 38 is preferably actuated by a dumping handle 40 located along a rear side of the bottom frame 18. The dumping handle 40 is connected to a latch mechanism 44 by a suitable linkage 42. The latch mechanism 44 releasably catches a pin or fixed point 46 at or below the surface of the vehicle deck 32. The latch 44 is preferably spring biased toward the latched or locking position, and can be released be rotating the dumping handle 40.

Figure 7:
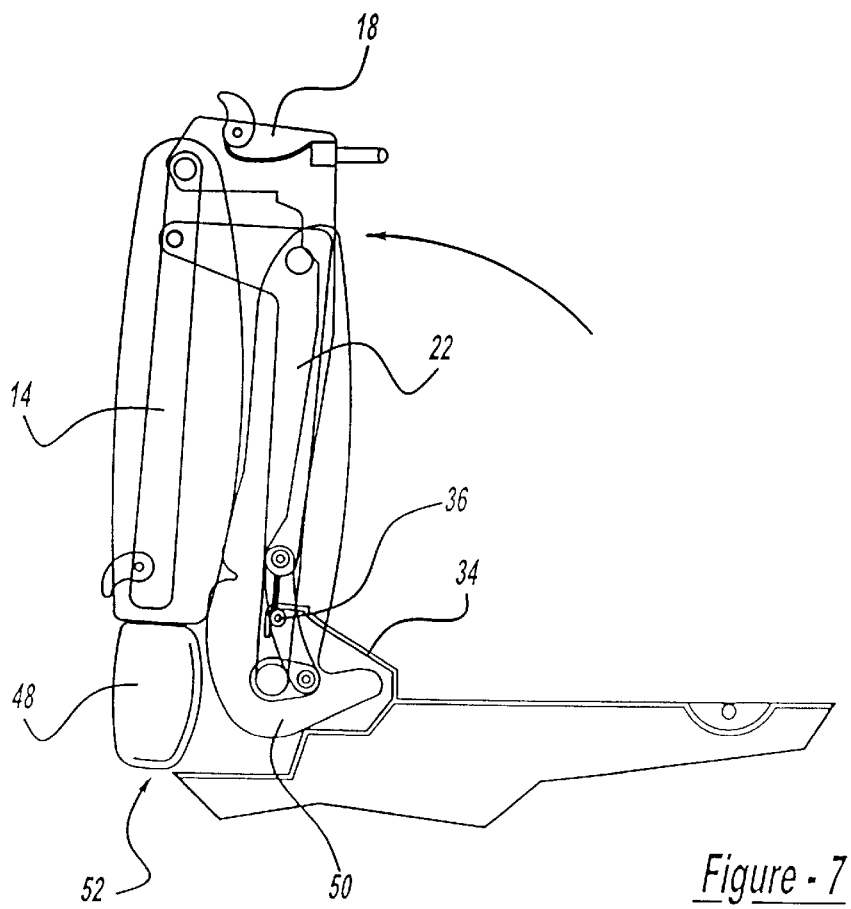
FIG. 7 is a side elevational view showing the vehicle seat in a fully dumped position.

Once the vehicle seat 10 is fully articulated as shown in FIG. 5, the vehicle seat 10 can be dumped. Dumping of the vehicle seat 10 is clearly shown in FIGS. 6 and 7, and is accomplished by rotating the dumping handle 40 and rotating the vehicle seat 10 and more specifically the bottom frame 18 about the dumping pivot 36. FIG. 7 shows vehicle seat 10 in a fully dumped and fully articulated position. As demonstrated in FIGS. 6 and 7, the dumping frame 34 is shaped so that the vehicle seat 10 can be dumped into a vertical upright position where the headrest 48 and the seat cushion end 50 are able to compactly fit in the space under the dumping frame 34 and the space defined by the vehicle floor pan 52.

The foregoing discussion discloses and describes exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. An articulating and dumping seat in combination with a motor vehicle having a vehicle deck, comprising:
    a bottom frame;
    a seatback frame pivotally supported on the bottom frame by an articulating pivot;
    a seat frame pivotally supported on a seatback pivot formed on the seatback frame;
    an articulating link connected between a lower pivot formed on the bottom frame and an upper pivot formed on the seat frame; and
    a dumping frame secured to the vehicle deck, the dumping frame having a dumping pivot for supporting the bottom frame;
    wherein the seat frame articulates forwardly and downwardly relative to the bottom frame as the seatback pivots about the seatback pivot and the bottom frame dumps forwardly and upwardly as and the bottom frame pivots about the dumping pivot.

2. The seat of claim 1 further including a dumping mechanism detachably connecting the bottom frame and the vehicle deck, the dumping mechanism being activated by a dumping handle.

3. The seat of claim 1 wherein the dumping frame includes a first vertical member and a second angled member, the bottom frame being pivotally supported on the second angled member so that seat frame rotates to a substantially dumped vertical position.

4. The seat of claim 1 further including a seatback cushion surrounding the seatback frame and a seat cushion surrounding the seat frame.

5. The seat of claim 1 further comprising an articulation release handle, the articulation release handle releasing the seatback frame for rotation about the articulating pivot.

6. The seat of claim 1 further including a head rest connected to the seatback frame.

7. An articulating seat mechanism in combination with a seat assembly of a motor vehicle having a vehicle deck, comprising:
    a seatback frame coupled to a bottom frame by an articulating pivot and coupled to a seat frame by a seatback pivot;
    an articulation link coupled between the seat frame by an upper pivot and the bottom frame by a lower pivot, said articulation link shaped to permit said seat frame to move in an forward and downward arcuate path relative to the bottom frame while said seatback frame is rotating forward and downward about the articulation pivot, thereby permitting the seatback frame to rotate to a substantially parallel position relative to the horizontal vehicle deck.

8. The articulating seat mechanism of claim 7 wherein the seatback frame moves in response to an articulation release handle.

9. The articulating seat mechanism of claim 7 wherein the bottom frame is connected to a dumping frame by a dumping pivot, the dumping pivot positioned so that the seat assembly rotates to a fully dumped position.

10. The articulating seat mechanism of claim 9, wherein the dumping frame is shaped so that a head rest and one end of a seat cushion of the seat assembly move above a floor pan while the seat assembly is rotated to a fully dumped position.

11. The articulating seat mechanism of claim 9 further includes a dumping mechanism for releasing the bottom frame from the vehicle deck and allowing the bottom frame to be rotated about the dumping pivot.

12. An articulating seat mechanism in a seat assembly, comprising:
    a bottom frame;
    a seatback frame pivotally supported on the bottom frame by an articulating pivot;
    a seat frame pivotally supported on the seatback frame by a seatback pivot; and
    an articulation link connected between a lower pivot formed on the bottom frame and an upper pivot formed on the seat frame;
    whereby the bottom frame, the seatback frame, the seat frame and the articulation link forming a four bar linkage which allows the seat frame to move forwardly and downwardly relative to the bottom frame.

13. The articulating seat mechanism of claim 12 wherein the seatback frame moves in response to an articulation release handle.

14. The articulating seat mechanism of claim 12 wherein the bottom frame is connected by a dumping pivot to a dumping frame, the dumping pivot positioned so that the seat assembly rotates to a fully dumped position.

15. The articulating seat mechanism of claim 14 further includes a dumping mechanism for releasing the dumping pivot.

16. The articulating seat mechanism of claim 14, wherein the dumping frame is shaped so that a head rest and a seat cushion end of the seat assembly move above a floor pan while the seat assembly is rotated to a fully dumped position.

* * * * *